Feb. 21, 1967

J. R. DE HAAN 3,304,728

GAS COOLED STORAGE CONTAINER

Filed Oct. 15, 1965

INVENTOR
James R. DeHaan

BY *Griffin and Branigan*

ATTORNEYS

FIG. 4.

Feb. 21, 1967    J. R. DE HAAN    3,304,728
GAS COOLED STORAGE CONTAINER
Filed Oct. 15, 1965    4 Sheets-Sheet 3

INVENTOR
James R. DeHaan

BY *Griffin and Branigan*
ATTORNEYS

Feb. 21, 1967  J. R. DE HAAN  3,304,728
GAS COOLED STORAGE CONTAINER
Filed Oct. 15, 1965  4 Sheets-Sheet 3

INVENTOR
James R. DeHaan
BY Griffin and Branigan
ATTORNEYS

United States Patent Office 3,304,728
Patented Feb. 21, 1967

3,304,728
GAS COOLED STORAGE CONTAINER
James R. De Haan, Boulder, Colo., assignor to Cryogenic Engineering Company, Denver, Colo.
Filed Oct. 15, 1965, Ser. No. 496,431
36 Claims. (Cl. 62—45)

This is a continuation-in-part of my U.S. patent application, S.N. 309,191, filed on September 16, 1963, and issued as U.S. Patent 3,217,504, on November 16, 1965.

This invention relates to fluid storage containers and more particularly to an improved insulation system for such containers.

Cryogenic fluids and other materials that must be maintained at extreme temperatures are frequently stored in Dewar type containers. That is, double-walled vessels wherein the space between an inner wall and an outer wall is evacuated. In order to prevent any substantial heat leak between the two walls, a variety of insulation materials have been utilized in the gas evacuated space. It has also been proposed to employ gas release for its refrigeration effect in structures of the Dewar type, but in the arrangements developed to date, such systems have been effective only at limited temperature levels.

One type of insulation material that is commonly placed in the gas evacuated space is a composite insulation consisting of alternating layers of a thin flexible metal foil and glass fiber paper. In some instances a coiled vent pipe has been wrapped around a shield surrounding the inner container and this in turn has been surrounded by the foil-fiber laminate. In this latter type of device the gases from the inner vessel are directed through the vent pipe so as to absorb heat from the shield. In this manner some of the refrigeration in the boil-off gas is put to good use rather than being completely wasted. If the stored fluid is helium, for example, the shield is refrigerated at a temperature of about 75° K. and the temperature of the warm outer wall is about 300° K. When the cold boil-off helium gas is vented directly from the shield to the outer wall, therefore, the refrigeration value in the boil-off gas between the shield temperature and the warm wall temperature is wasted.

Hence, it is a primary object of this invention to provide an improved insulation system for Dewar type containers. Although not limited thereto, it is a more particular object of the invention to provide both an improved gas cooled cryogenic storage vessel and a gas cooled storage vessel wherein the refrigeration of the boil-off gas is used at all temperature levels between the temperature of the cold wall and the temperature of the warm wall.

It is a further object of this invention to provide a novel type of low temperature storage container which utilizes controlled gas cooling to maintain desired temperatures in the storage receptacle for protracted periods.

Another object of my invention is to provide a simple, durable, and efficient gas-cooled insulation system for storage containers of the Dewar type which effectively minimizes heat leaks between an inner container and an outer shell over protracted intervals.

It has been suggested by some that the refrigeration value of cold boil-off gases be applied to various selected layers of laminated insulation by means of heat conductive shields extending from a coiled vent tube to selected layers of the laminate. This shield-transfer type of structure, however, is extremely complex, takes up a great deal of space, is delicate, and is therefore difficult to construct. Moreover, because in practice only a few of the layers can be refrigerated in this manner it is not as efficient as the structure of the invention. Consequently, it is another object of this invention to provide a structure for utilizing the refrigeration value of the boil-off gases without having the many disadvantages of the shield-transfer type of structure.

According to the principle of the invention the evacuated space between the walls of a Dewar vessel is provided with a laminated insulation which is wrapped about the inner wall. A relatively small diameter vent tube is connected at one end to the interior of the inner vessel and spirally wrapped between the successive layers of the laminated insulation. In this manner, as each layer of insulation is deposited one upon the other the vent tube contacts each layer of the laminate. As the layers of insulation are placed one upon the other the diameter of the vent tube's spiral becomes larger and larger and finally extends out to the outer wall. The present invention, therefore, represents an innovation over prior practice in combining laminated insulation material with a special type of conduit system disposed within the insulation filling the gas evacuated space.

Another aspect of the invention relates particularly to the storage of liquid hydrogen. Hydrogen exists in two forms. One is ortho-hydrogen and the other is para-hydrogen. At about 20° K. hydrogen is almost entirely of the para type when at equilibrium. At 300° K., however, hydrogen is about 25% para and 75% ortho. As hydrogen becomes warmer, therefore, its constituency changes from predominately para to mostly ortho. Moreover, as this conversion takes place the hydrogen absorbs heat. Although cryogenicists have been aware of these particular phenomena for many years, it is another object of the invention to provide a hydrogen storage vessel wherein the heat absorbing qualities of para to ortho conversion are fully utilized. In accordance with this aspect of the invention the spirally wrapped vent tube contains a plurality of catalyst beds along its length. The catalyst beds act to promote para-ortho conversion at successively higher temperature levels and thus use the refrigeration of the conversion to cool intermediate layers of the laminate.

When a Dewar type of vessel is filled with a cryogenic fluid its supply tank is usually at a somewhat higher pressure than the container being filled. Consequently, some of the cryogenic fluid flashes to gas as soon as it enters the reduced pressure area within the vessel being filled. In addition, when the vessel is at a higher temperature than the fluid to be stored, such as room temperature at about 300° K. for example, some of the fluid is vaporized as soon as it is transferred into the vessel by means of a transfer line or the like. These gases caused by flashing and heat absorption must be vented out of the storage vessel in order that its pressure remain sufficiently low enough for the filling operation to continue. In the past these boil-off gases produced during cool-down and filling operations have been merely vented to the atmosphere. Hence, the refrigeration of this large volume of cold gases has been lost. Even in some of the devices where the boil-off gases have normally been used to refrigerate a single substantially isothermal shield, the boil-off gases generated during cool-down and filling have been vented directly to the atmosphere rather than passed through the shield's refrigeration conduit. This is because the volume of boil-off gases generated during the filling operation is so large that it causes too large a pressure drop when passed through the shield refrigeration system whereby the pressure inside the vessel rises to the point where it can only be filled at an undesirably slow rate. Hence, it is still another object of this invention to provide a means for both minimizing the heat losses during filling and utilizing the refrigeration value of the large volumes of cold gases that are generated during filling and cool down.

It is another object of the invention to provide a method of filling an insulated storage vessel whereby the gases generated during the filling operation can be used to enhance the vessel's insulation.

In accordance with this aspect of the invention a means is provided for directing the boil-off gases that are generated during filling operations between only some of the successive layers of the laminated insulation before the filling gases are directed to the atmosphere. In one embodiment of this aspect of the invention a separate filling-vent tube is spirally wound between successive layers of the laminated insulation and vented through a valve to atmosphere only after it has contacted several successive layers of the laminated insulation. The length and bore of this filling-vent tube are determined by the amount of pressure drop therethrough that is acceptable for a given desired filling rate. In another embodiment the main-vent line is tapped at a point intermediate to the inner and outer walls and selectively vented through a valve to atmosphere. In this manner, the pressure in the vessel can be maintained desirably low during the filling operation by venting most of the large volumes of boil-off gas to atmosphere prior to the time that the gas has traversed the entire length of the main-vent tubing. Once the filling operation has been completed, however, the valve on this tap line is closed and the entire boil-off gas is once again permitted to contact each of the radiant heat barrier layers that is traversed by the interwound main-vent tube.

The foregoing and other objects, features, and advantages of this invention will be apparent from the following more particular description of preferred embodiments thereof as illustrated in the accompanying drawings, wherein the same reference numerals refer to the same parts throughout the various views. The drawings are not necessarily intended to be to scale, but rather are presented so as to illustrate the principles of the invention in clear form.

Figure 1:
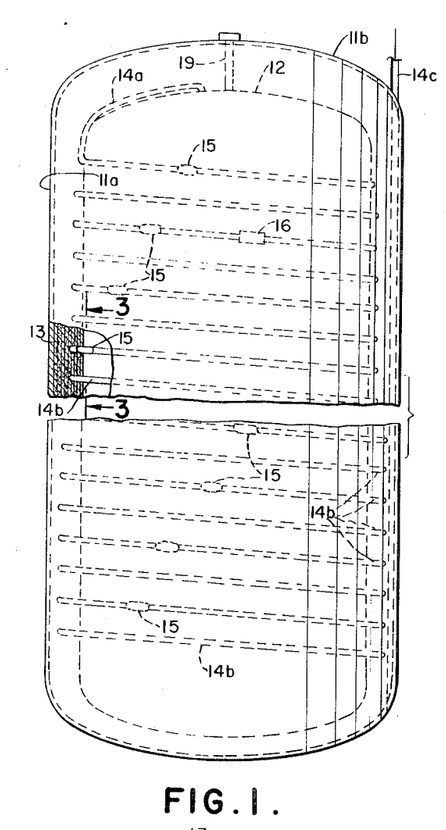
FIG. 1 is a side elevation of one embodiment of a storage container for cryogenic liquids utilizing the gas-cooled insulation system of my invention, inclusive of a spiral-wound conduit of progressively increasing diameter in a downstream direction and partially broken away to show the arrangement of parts comprising the insulation system.

FIG. 1 illustrates a typical installation utilizing a gas-cooled insulation system of the invention. As shown, a Dewar-type storage container comprising an outer shell or member 11 substantially encloses an inner container or member 12 for storage of material to be maintained at cryogenic temperatures. Normally, the inner container includes a cryogenic fluid, not shown. Outer member 11 is closed on its sides 11a and both ends 11b so as to permit gas evacuation of the space between said members after final assembly.

Container 12 is of a smaller diameter than the shell 11 and supported in any suitable manner (not shown) in substantially uniformly spaced relation to shell 11. Container 12 is covered by laminated insulation 13. In a typical installation this may comprise on the order of 50 wraps of glass paper and aluminum foil laminate. A laminated installation of this type is more fully described in an article by R. H. Kropschot entitled "Multiple Layer Insulation for Cryogenic Applications" which appears in the March 1961 issue of Cryogenics (vol. 1, No. 3). Another suitable composite multilayer insulation is a metal coated, flexible plastic material more fully described in U.S. Patent No. 3,018,016 which issued on January 23, 1962 to M. P. Hnilicka. Other types of multilayered insulations are also suitable. In whichever type of laminated structure that is employed, a continuous tube or conduit 14 of heat conductive composition is wrapped within the insulation 13 and has an inlet portion 14a in advance of a convoluted portion 14b encompassing the portion of container 12 within shell 11, and an exterior discharge portion 14c for the final gas release.

Different materials may be utilized in forming the conduit. The first or upstream portion may be stainless steel tubing, for example, and the remainder may be copper tubing joined by a suitable coupling 16. The convoluted portion 14b is wrapped between successive layers of the laminate and spirally along the length of the container 12 in a progressively increasing diameter towards its downstream end. In this manner there is only one thickness of tubing at any increment of length in the space between side 11a of the outer member and the container 12. Hence, the laminated insulation is neither unduly compressed nor distorted as is the case when a plurality of heat transfer devices are located at the same circumferential plane along the axis of the vessel.

Both when the storage vessel is being filled and while it is storing a cryogenic fluid, there is a temperature differential across the laminated insulation. For example, when the cryogenic fluid is liquid helium and the ambient air is at room temperature the cold wall temperature is about 4° K. and the warm wall temperature is about 300° K. With the arrangement described the cold boil-off gases move progressively through the tube's convoluted portion 14b to the exterior discharge portion 14c. Hence, the cold boil-off gases are continually directed to warmer and warmer regions whereby the refrigeration which is available at higher and higher temperatures can be utilized. In this manner, therefore, I obtain the maximum utilization of the cold boil-off gases.

The arrangement shown is particularly suited for the storage of liquid hydrogen and includes catalyst beds 15 disposed at intervals along the convoluted portion of the conduit 14b. The catalyst beds, used to promote para-ortho conversion, are placed at relatively close intervals at the upstream end, 5 feet apart for example, and at greater intervals throughout the remainder of the convoluted portion. For example, the intermediate portions of the convoluted conduit might have the catalyst bed spaced 10 feet apart and the extreme downstream portion of the convoluted conduit may have a spacing interval on the order of 20 feet. A typical installation as described may have a total length of conduit of about 250 feet. The conduit is wrapped in the insulation at a spacing or pitch of about 2 inches per convolution, for example, and contains 12 beds of catalyst. The first five beds are placed at 5 foot intervals, the next four at 10 foot intervals and the last three at 20 foot intervals. Such spacing is indicated in FIG. 1 although the intervals shown are not necessarily to scale.

Various catalyst compositions may be utilized in the beds. For example, hydrous ferric oxide, hydrous chromic oxide, and various nickel catalysts have been found to be quite satisfactory. The hydrous ferric oxide has been found to be particularly effective in a system of the type described. In addition, I have found that the more active the catalyst, the less is required. In a typical installation the amount of boil-off gases during storage are not too large. Hence, I have found that catalyst beds of about 1 inch in length are satisfactory. Similarly, I have found it more advantageous to have the para-ortho conversion take place at lower temperatures. Consequently, I provide more beds at closer intervals along the upstream end of portion 14b where they are disposed closer to the inner container 12 than they are to the outer shell 11.

As the temperature of the boil-off gases increases in its travel through the convoluted tube, the para-ortho equilibrium level shifts to a higher ortho-hydrogen content at higher temperatures. Hence, the placement of the catalyst beds along the convolute, as noted above, induces the para to ortho conversion to take place within the laminated insulation, rather than occurring after the boil-off gas is vented to atmosphere as tends to occur without the catalyst. Consequently, when the cryogenic fluid is hydrogen the invention not only provides a device for obtaining maximum use of the refrigeration of the boil-off gases, but the catalyst beds take advantage of the back conversion of para to ortho hydrogen which results in an even further increase in the amount of refrigeration available in the system.

The above-described insertion of para to ortho conversion catalyst beds applies, of course, only to devices used for the storage of hydrogen. It should be understood, therefore, that if the storage container is not to be used with hydrogen the catalyst would neither be required nor desirable.

A Dewar-type container of the type shown in FIG. 1 may be installed for operation at any required site and will have the voids in insulation 13 gas evacuated when it is to begin operation. The interior of container 12 contains the material or fluid to be maintained at low temperatures. The gas or vapor, such as para-hydrogen, for example, flows through the line 14 at a rate that is determined by the amount of heat leak into the inner container, the pressure therein, the setting of a vent valve (conveniently located downstream from the discharge portion of the tube 14c and not shown) the size of the bore in conduit 14, and the fill of the catalyst beds 15. Once started, that flow through conduit 14 is continuous so as to provide the aforementioned continuous gas refrigeration and restrict the amount of heat leak from the outer to the inner container.

The arrangement shown and described refrigerates at all available temperature levels from the temperature of the boiling cryogenic fluid to ambient temperature. Hence, the above structure utilizes the refrigeration available in the boil-off gases.

In order to demonstrate the effectiveness of the aforedescribed system, a unit of the type shown in FIG. 1 was subjected to comparative testing. In one case the laminated insulation was equipped with a gas-cooling tube and in another the structure was operated as though the gas-cooling tube was omitted from the storage vessel's laminated insulation. The boil-off rate with the invention's gas cooling structure was measured at 1.03% of the stored volume per day. The structure without such cooling has a boil-off rate of 2.06% of the stored volume per day. Thus, it is evident that the utilization of the present invention provides a very desirable low boil-off rate.

Figure 2:
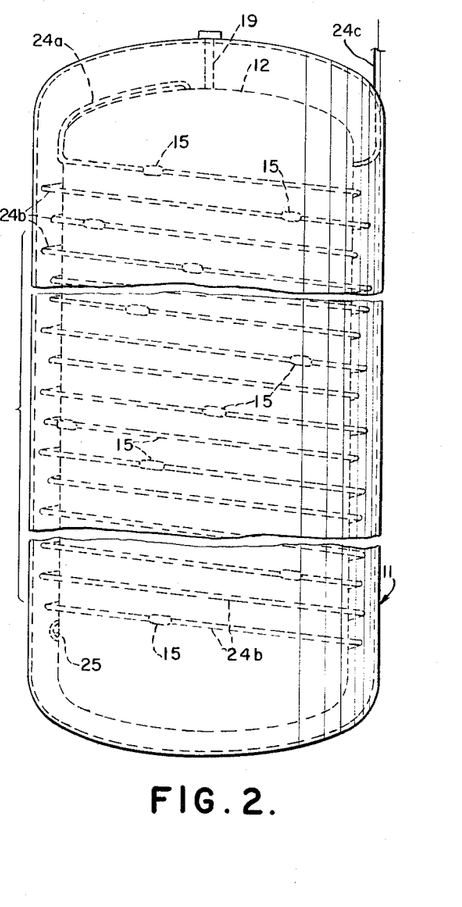
FIG. 2 is a side elevation of another embodiment of a storage container for cryogenic liquids utilizing a conduit in which the spiral winding arrangement is repeated in an opposite direction along the length of the container.

FIG. 2 illustrates another embodiment of a Dewar type container utilizing features of my invention. This container also is shown as having catalyst beds 15 in the gas-cooling tube, but it will be understood by those skilled in the art that such beds are not necessarily provided when cryogenic fluids other than liquid hydrogen are stored in the container. As the assembly shown in FIG. 2 differs from FIG. 1 only in the tube winding details, similar reference numerals have been applied to all duplicate components.

The gas-cooling tube 24 of FIG. 2 comprises an inlet portion 24a, a convoluted portion 24b, and an exterior discharge portion 24c. These portions of the gas-cooling tube correspond to the portions 14a, 14b, and 14c described previously. Again, in this form, the initial upstream winding or wrap is disposed in close proximity to the exterior surface of inner member 12 and succeeding wraps widen progressively in the downstream direction to an intermediate point 25 near the opposite end of inner member 12. At this point, the tubing is bent at a substantial angle and wound in a reverse direction, but at the same pitch and in a progressively widening diameter with the convolutions of the reverse winding located about midway between the convolutions located upstream from point 25.

It will be noted that the spacing between turns in the convoluted portions extending to point 25 is substantially greater than that in FIG. 1. The FIG. 2 spacing or pitch may be 4 inches, for example, rather than the 2 inch pitch of the example previously given. Each turn or wrap between the inlet portion 24a and point 25 is disposed between different layers of the laminar insulation and the same is true of the reverse winding pattern. Hence, as was the case in the FIG. 1 embodiment, this arrangement also provides one wrap of tubing between each insulation layer encompassing inner container 12. While the arrangement of FIG. 2 is considered to provide a more effective utilization and distribution of the refrigeration effect it is somewhat more difficult to fabricate than the former embodiment. On the other hand the discharge portion 14c of the FIG. 1 structure extends substantially the entire length of the storage vessel from the lower right hand side in FIG. 1 to the upper right hand corner. Consequently, this discharge portion of the cooling tube causes the laminated insulation to be compressed somewhat—a situation that is not generally desirable.

Both forms of containers illustrated and described thus far are effective in obtaining the objects of the invention and the value of the increased efficiency of such units far exceeds any added costs of fabrication. In each of the embodiments, the inner container is filled through a suitable fill tube indicated in FIGS. 1 and 2 as tube 19, which is capped when the container is filled so that the only gas release is through the discharge portions 14c or 24c. Although these discharge portions have been illustrated as being discharged to atmosphere it will be understood by those skilled in the art that the boil-off gases may be discharged or directed into a suitable collector or container for recovery and reuse of such material.

An embodiment of the invention will now be described wherein the refrigeration of the boil-off gases generated during filling operations may be utilized. As was previously noted the amount of boil-off gases generated during cool down and filling operations is unusually large and cannot pass through a long length of cooling conduit because the pressure drop across the conduit is too great. One recourse is simply to bypass the cooling vent tube during the cool down or filling operation with a consequence that the refrigeration in the gas is wasted.

Figure 3:
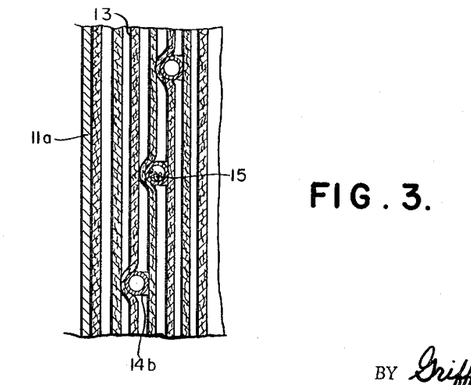
FIG. 3 is a developed section taken along the line 3—3 of FIG. 1.
Figure 4:
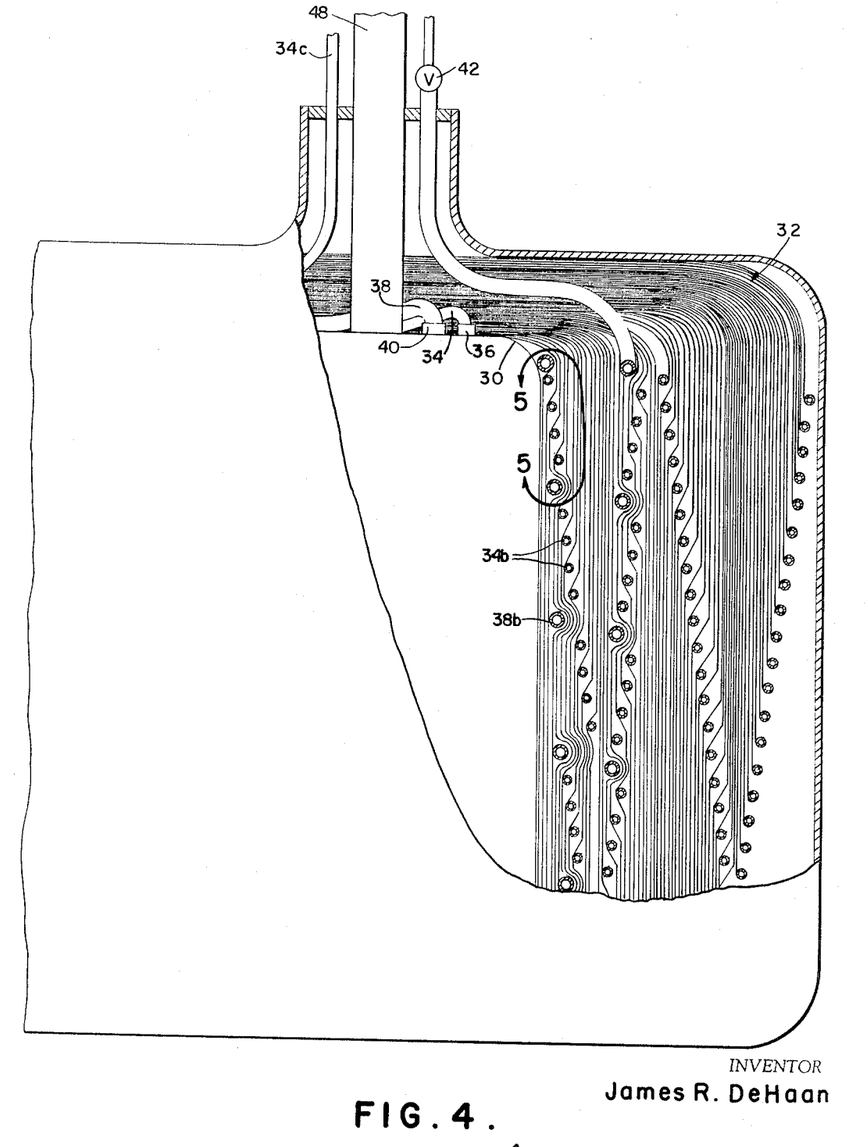
FIG. 4 is an elevational view, partially broken away, of a storage vessel employing another embodiment of the invention.

In FIG. 4 the wall of an inner container 30 is wrapped with a laminated insulation 32 in a manner similar to that described in connection with the embodiments of the invention illustrated in FIGS. 1 through 3. That is, a relatively small diameter vent tube 34 is connected to the inner container by any suitable means such as connector 36. The vent tube is spirally wound between successive radiation barrier layers of the laminated insulation 32 as indicated by convolute windings 34b in FIG. 4. Finally after having spiralled through the laminate, the vent tube is extended out of the vessel's outer wall at 34c. A separate filling-vent tube 38 is also connected to the inner container by means of a connector 40. It too is spirally wrapped about the inner vessel between successive radiation barrier layers as indicated by convolute portions of the filling-vent tube 38b in FIGS. 4 and 5. As will be more fully described shortly, after a convenient length of the filling-vent tube 38 has been wound between the layers of the laminated insulation, it is vented to atmosphere (or a recovery device) through a valve 42.

As was previously noted, the purpose of the filling-vent tube is to conduct the large volumes of boil-off gases that occur during filling operations through the inner layers of the laminated insulation rather than vent them directly to atmosphere as has been done in the past. Both because of its small bore and relatively long length, the vent tube described in connection with the FIGS. 1 and 2 embodiments of the instant invention does not, as a practical matter, permit the filling boil-off gases to be vented therethrough. For this reason the filling-vent tube 38 has a somewhat larger bore and shorter length than the main vent tube 34. Similarly, although not limited thereto, in order to permit it to traverse the length of the inner container without too large a pressure drop the filling-vent tube has been illustrated in FIG. 5 as having a larger pitch than the main vent tube 34.

Figure 6:
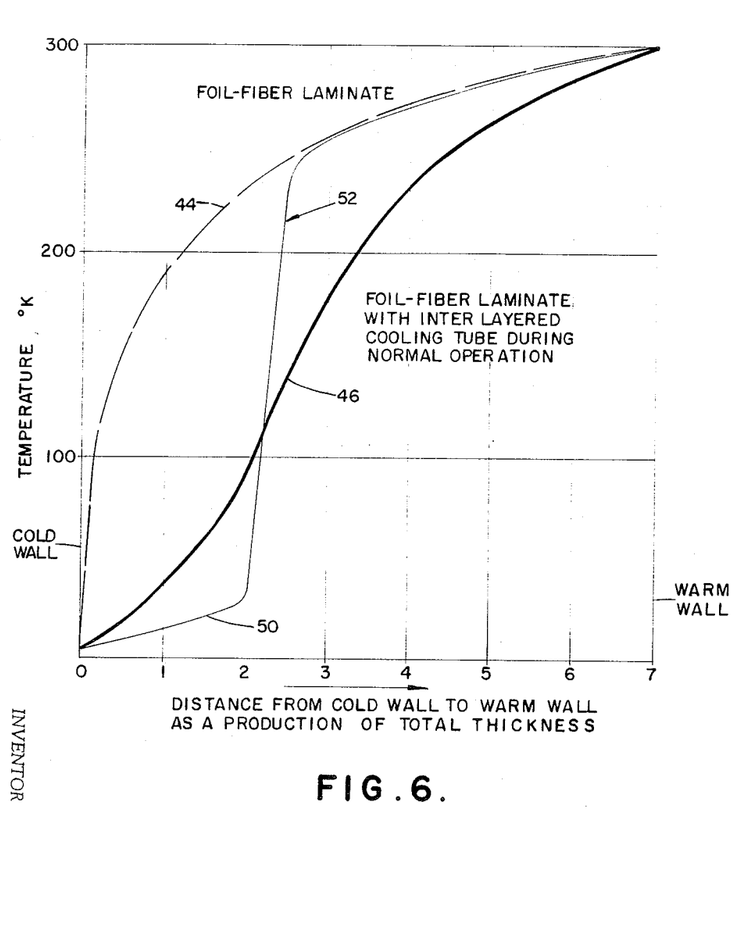
FIG. 6 is a graph used to illustrate the advantages of both the inter-layered cooling tube aspect of the invention and the filling-vent tube aspects of the invention.

The operation of this embodiment of the invention will now be described in connection with FIG. 6. The graph of this figure illustrates the advantages of both the fully interlayered main-cooling tube aspects of the invention as well as the partially interlayered or filling-vent tube aspects of the invention. The left-hand side of the graph represents the temperature at the cold wall of a vessel containing liquid helium. The right-hand side of the graph represents the warm or outer wall of the same liquid helium storage vessel. The numbers along the abscissa, therefore, represent the thickness of the laminated insulation with respect to the cold wall. The ordinate, on the other hand, represents the temperature of a given point in the insulation.

The curve 44 indicates a general temperature gradient across a laminated insulation of the type described in the aforementioned Kropschot article. The curve 46, on the other hand, represents the temperature distribution across the laminated insulation of the invention during normal operation. That is, one that includes a vent tube which is spirally wrapped between successive radiant heat barrier layers of the laminate.

The vertical distance between these two curves represents the temperature difference between corresponding insulation thicknesses in thusly insulated vessels. The lower the temperature at a given insulation thickness the lower the heat inleak to the storage container will be. This is because the driving force for heat across the same thickness of insulation is a direct function of the temperature differential across that thickness. Hence, the insulation of curve 46 has a much lower heat leak than that of curve 44. For example: at point 1 on the abscissa the temperature of a standard laminated insulation is illustrated as being about 190° K. whereby the temperature difference between the cold wall and curve 44 is about 180° K. The temperature of the insulation of the invention at point 1, however, is about 45° K. for a difference of only about 35° K. The driving force for heat across the same thickness of insulation in this example, therefore, is about five times greater for curve 44 than for curve 46.

During the time that a vessel having a laminated insulation of the type represented by curve 44 is being filled, the temperature distribution across the laminate is quite erratic and not specifically illustrated. Although erratic, this temperature distribution curve is somewhat above the curve 44 during the time that this type of vessel is being cooled down and filled. With the embodiment of the invention described in connection with FIGS. 4 and 5, however, the valve 42 is opened at the beginning of the cool down and filling operation. Hence, when the cryogenic fluid is introduced through fill tube 48 (FIG. 4) the large volumes of cold boil-off gases begin to exit through both of the gas vent tubes 34 and 38. The refrigeration of these cold boil-off gases is almost immediately distributed to the radiation barrier layers that are contacted by the convolute portions of these two vent tubes. Hence, the temperature distribution across those layers of the laminated insulation that are contacted by both the main-vent tube 34 and the filling-vent tube 38 is substantially that shown by portion 50 of curve 52 in FIG. 6.

In this latter case point 2 on the abscissa provides a telling example of this aspect of the invention's merit. At that point the temperature differential between curve 46 and the cold wall is about 90° K. while the corresponding differential for curve 52 is only about 20° K. During and shortly after filling, therefore, the structure of curve 52 is another four and one-half times better than that of curve 46 and far better than that of curve 44.

Once the volume of filling boil-off gases exceeds some minimum level the pressure drop across the main vent tube 34 becomes so large that the volume of boil-off gases passing therethrough, relative to the volume of boil-off gases passing through the filling-vent tube 38, becomes very small. This relatively small volume is still available, however, to cool the remainder of the radiation barrier layers that are not contacted by the filling-vent tube 38. But because the filling-vent tube, which carries the bulk of the cold boil-off gases, does not contact these outer layers the temperature distribution thereacross rises rapidly until it approaches the curve 44 as shown by the main portion of curve 52 on the graph of FIG. 6. Once the storage vessel is cooled down and filled, on the other hand, the valve 42 may be closed and the entire volume of boil-off gases, now much smaller than during the filling operation, is passed through the main vent tube 34. After this time, therefore, the curve 52 gradually drops to coincide with curve 46 as more of the refrigeration of the cold boil-off gases is transferred to the outer radiation barrier layers of the laminated insulation.

Figure 5:
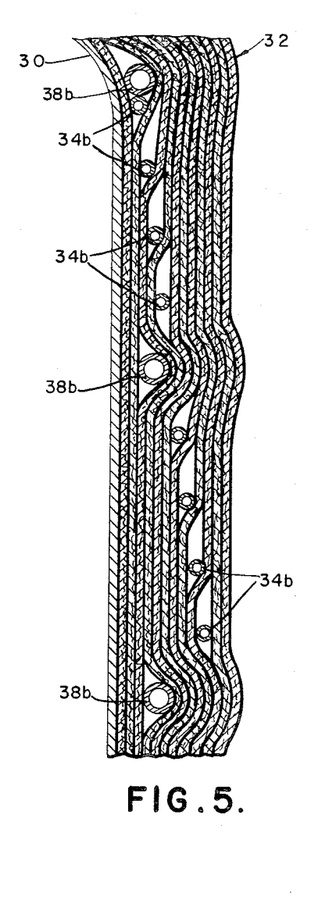
FIG. 5 is a developed section included within the arc 5—5 in FIG. 4.
Figures 7, 8:
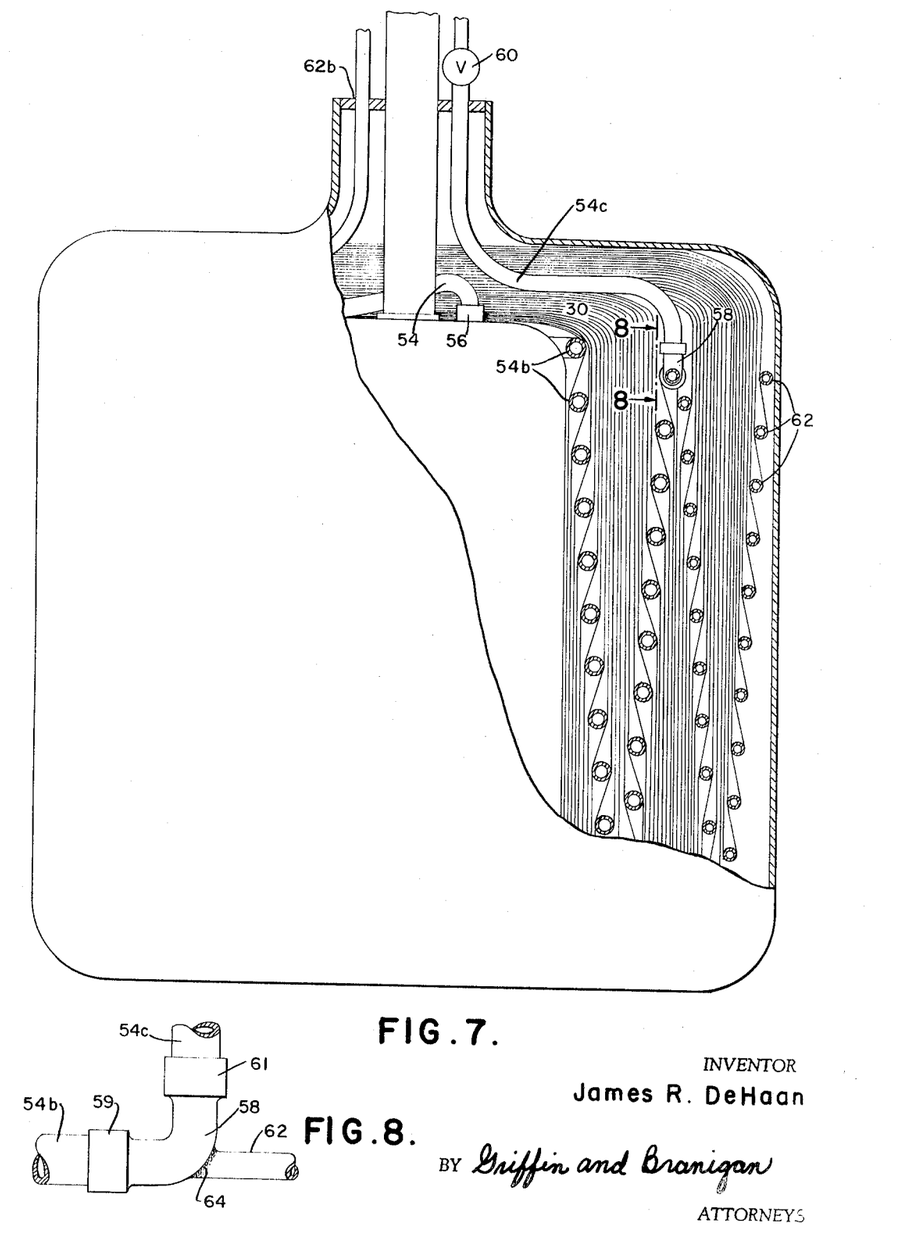
FIG. 7 is an elevational view, partially broken away, of a storage vessel illustrating another embodiment of the filling-vent tube aspects of the invention.
FIG. 8 is a developed sectional view taken along the lines 8—8 of FIG. 7.

The structure of FIG. 7 is similar to that described in connection with FIGS. 4 and 5 except that FIG. 4's separate filling-vent tube 38 has been eliminated. Instead, a vent tube 54 is connected to the inner vessel 30 by means of a connector 56. This vent tube 54 is relatively large bored as compared with tube 34 and is spirally wrapped between successive layers of the laminated insulation, in the same manner as has been previously described, as shown by convoluted portions 54b thereof. As particularly shown in FIG. 8 an L section 58 is connected at one end 59 to the convoluted vent tube portion 54b and at the other end 61 to a discharge vent portion 54c. The discharge vent tube 54c extends through a valve 60 to atmosphere in the same manner as the filling-vent tube 38b of FIG. 4. A vent tube 62 is connected to the center portion of the L 58 at 64 as shown in FIG. 8. Preferably this vent tube 62, which extends out of the vessel's outer wall at 62b has a bore that is of about the same size as the vent tubes 14, 24, and 34 of the previous embodiments of the invention.

In operation, the embodiment of the invention just described is substantially the same as the embodiment of the invention already described in connection with FIG. 6. An advantage of this latter embodiment, however, can be readily understood by first observing that when the main-vent tube 34 and the filling-vent tube 38 in FIG. 4 have a difference in pitch as has been illustrated, the two vent tubes are required to pass each other as they are spirally wrapped between the radiation barrier layers of the laminated insulation. Hence, the laminated insulation is undesirably forced out of shape and compressed wherever the two vent tubes cross. The FIG. 7 embodiment, on the other hand, does not have this drawback and as illustrated in FIG. 8 is also easier to fabricate.

In this connection it should be pointed out that it is not always practical to have only one convolution of vent tubing across the annular thickness between the inner and outer walls at any given point along the axis of the convolute. For example, in Dewars with short axial lengths there is not adequate space to wrap all of the tubing such that there is only one thickness at any given point along the axis of the vessel. In this situation a plurality of layers of tubing may be used, provided that an adequate thickness of insulation space is available. In FIGS. 4 and 7, for example, four tiers of concentrically convoluted tubing have been illustrated.

It will be appreciated by those skilled in the art that the above described structures provide an additional conservation of the refrigeration in the cold filling gases by the inclusion of a separate vent line and valve for use during the filling operation. In this manner the net result is that, by lowering storage vessel pressures and reducing evaporation of the fluid during filling, the refrigeration from the cool down and the filling boil-off gases is used to both hasten the cool down of the insulation and permit a more rapid filling operation.

Similarly, for purposes of clarity and simplicity, the latter described embodiments of the invention have not been illustrated in the drawings as including catalyst beds corresponding to beds 15 in FIGS. 1 and 2. It should be understood, however, that when hydrogen is stored in vessels of the type illustrated in FIGS. 4 and 7, for example, catalyst beds may be included in the spiral vent tubes in the manner previously described.

While the invention has been particularly shown and described with reference to preferred embodiments thereof, it will be understood by those skilled in the art that various changes in form and details may be made therein without departing from the spirit and scope of the invention. For example, the convolutions of the spirally wrapped conduits have been described as being of an increasing diameter. In the case of a tapered vessel, however, the outer convolute may have a smaller diameter than the inner convolute.

The embodiments of the invention in which an exclusive property or privilege is claimed are defined as follows:

1. In a fluid storage vessel of the type in which an insulation comprising a plurality of radiant heat barrier layers is wrapped about an inner wall which defines the storage volume of said vessel and wherein a space between said inner wall and an outer wall is evacuated, the combination comprising:
    conduit means extending through said vacuum space from said inner wall to said outer wall;
    means for connecting said conduit means to said storage volume;
    said conduit being continuously spirally wrapped between successive radiant heat barrier layers as said conduit approaches said outer wall;
    and means for diverting at least part of the flow of gas from said storage volume to said outer wall after said gas passes between only those radiant heat barrier layers which are nearer to said inner wall.

2. The apparent of claim 1 wherein the convolutions of said spirally wrapped conduit become further from said inner wall as said conduit approaches said outer wall.

3. The apparatus of claim 2 wherein said diverting means is a valve.

4. The apparatus of claim 1 wherein said diverting means is a valve.

5. In a fluid storage vessel of the type in which an insulation comprising a plurality of radiant heat barrier layers is wrapped about an inner wall which defines the storage volume of said vessel and wherein a space between said inner wall and an outer wall is evacuated, the combination comprising:
    a first conduit extending through said vacuum space from said inner wall to said outer wall;
    a first connector for connecting one end of said first conduit to said storage volume;
    said first conduit being continuously spirally wrapped between successive radiant heat barrier layers so that the convolutions of said spiral become further from said inner wall as the first conduit approaches said outer wall;
    a first vent means connecting the other end of said first conduit through said outer wall;
    a second conduit;
    a second connector located between said first connector and said first vent means on said first conduit for connecting one end of said second conduit to said first conduit;
    and a second vent means for connecting the other end of said second conduit through said outer wall.

6. The apparatus of claim 5 including a valve in said second conduit.

7. The apparatus of claim 5 wherein the cross sectional area of said first conduit between said inner wall and said second connector is greater than the cross sectional area of said first conduit between said second connector and said outer wall.

8. The apparatus of claim 7 including a valve in said second conduit.

9. In a fluid storage vessel of the type in which an insulation comprising a plurality of radiant heat barrier layers is wrapped about an inner wall which defines the storage volume of said vessel and wherein a space between said inner wall and an outer wall is evacuated, the combination comprising:
    a first conduit extending through said vacuum space from said inner wall to said outer;
    a first connector for connecting one end of said first conduit to said storage volume;
    said first conduit being continuously spirally wrapped between successive radiant heat barrier layers so that the convolutions of said spiral become further from said inner wall as the first conduit approaches said outer wall;
    a first vent means connecting the other end of said first conduit through said outer wall;
    a second conduit extending through said vacuum space from said inner wall to said outer wall;
    a second connector for connecting one end of said second conduit to said storage volume;
    said second conduit continuously spirally wrapped between only the successive radiant heat barrier layers that are nearer to said inner wall;
    and a second vent means for connecting the other end of said second conduit to said outer wall.

10. The apparatus of claim 9 including a valve in said second conduit.

11. The apparatus of claim 9 wherein the cross sectional area of said second conduit is greater than the cross sectional area of said first conduit.

12. The apparatus of claim 11 including a valve in said second conduit.

13. In a cryogenic fluid storage vessel of the type in which an insulation comprising a plurality of radiant heat barrier layers is wrapped around a cold wall which defines an inner cryogenic fluid storage container of said vessel and wherein a space between said cold wall and a warm outer wall is evacuated, the combination comprising:
    a first conduit for conducting boil-off gases from the cryogenic fluid in the inner container through said vacuum space from said cold wall to said warm wall;

a first connector for connecting one end of said first conduit to said inner container;

said first conduit being continuously spirally wrapped between successive radiant heat barrier layers so that the convolution extends substantially throughout the length of said inner container and said spiral becomes further from said inner wall as the first conduit approaches said warm outer wall;

a first vent means connecting the other end of said first conduit through said warm outer wall, whereby the refrigeration of said cold boil-off gases is transferred to said radiant heat barrier layers at substantially all temperature levels between the temperature of the boiling cryogenic fluid and the temperature of said warm outer wall;

a second conduit;

a second connector located between said first connector and said first vent means on said first conduit for connecting one end of said second conduit to said first conduit;

and a second vent means for connecting the other end of said second conduit through said warm outer wall, whereby the refrigeration of said boil-off gases is primarily transferred to said radiant heat barrier layers at substantially all temperature levels between the temperature of the cryogenic fluid and the temperature at said second connector.

14. The apparatus of claim 13 including a valve in said second conduit.

15. The apparatus of claim 14 including a plurality of catalyst beds for converting para to ortho hydrogen and disposed at intervals throughout said first conduit.

16. The apparatus of claim 13 wherein the cross sectional area of said first conduit between said cold wall and said second connector is greater than the cross sectional area of said first conduit between said second connector and said warm outer wall.

17. The apparatus of claim 16 including a valve in said second conduit.

18. The apparatus of claim 17 including a plurality of catalyst beds for converting para to ortho hydrogen and disposed at intervals throughout said first conduit.

19. In a cryogenic fluid storage vessel of the type in which an insulation comprising a plurality of radiant heat barrier layers is wrapped about a cold inner wall which defines an inner cryogenic fluid storage container of said vessel and wherein a space between said cold inner wall and a warm outer wall is evacuated, the combination comprising:

a first conduit for conducting cold boil-off gases from the cryogenic fluid in the inner container through said vacuum space from said cold inner wall to said warm outer wall;

a first connector for connecting one end of said first conduit to said inner container;

said first conduit being continuously spirally wrapped between successive radiant heat barrier layers so that the convolutions extend substantially throughout the length of said inner container and said spiral becomes further from said cold inner wall as the first conduit approaches said warm outer wall;

a first vent means connecting the other end of said first conduit through said warm outer wall;

a second conduit extending through said vacuum space from said cold inner wall to said warm outer wall;

a second connector for connecting one end of said second conduit to said inner container;

said second conduit being continuously spirally wrapped between only the successive radiant heat barrier layers that are nearer to said cold inner wall;

and a second vent means for connecting the other end of said second conduit through said warm outer wall, whereby the refrigeration of said cold boil-off gases is transferred to said radiant heat barrier layers at substantially all temperature levels between the temperature of the boiling cryogenic fluid and the temperature of said warm outer wall.

20. The apparatus of claim 19 including a valve in said second conduit.

21. The apparatus of claim 20 including a plurality of catalyst beds for converting para to ortho hydrogen and disposed at intervals throughout said first conduit.

22. The apparatus of claim 19 wherein the cross sectional area of said second conduit is greater than the cross sectional area of said first conduit.

23. The apparatus of claim 22 including a valve in said second conduit.

24. The apparatus of claim 23 including a plurality of catalyst beds for converting para to ortho hydrogen and disposed at intervals throughout said first conduit.

25. The method of filling a fluid storage vessel of the type in which a plurality of radiant heat barrier layers are wrapped about an inner wall which defines the storage volume of said vessel and wherein a space between said inner wall and an outer wall is evacuated, comprising the steps of:

directing a fluid to be stored into the storage volume of said vessel to fill said storage volume;

and directing the bulk of the gases generated during the foregoing step between only the successive radiant heat barrier layers that are nearer to the said inner wall and venting said gases through said outer wall.

26. The method of claim 25 including the step of directing the remaining gas between all of the radiant heat barrier layers.

27. The method of claim 26 including the step of controlling the flow of said gases between said successive radiant heat barrier layers nearer to said inner wall so that the pressure in said storage volume does not exceed a predetermined level during the filling operation.

28. The method of claim 25 including the step of controlling the flow of said gases between said radiant heat barrier layers nearer to said inner wall so that the pressure in said storage volume does not exceed a predetermined level during the filling operation.

29. The method of claim 25 including the step of directing the gases from said storage volume between the remainder of the successive radiant heat barrier layers in the evacuated space after the filling operation is completed.

30. The method of claim 29 including the step of controlling the flow of said gases between said successive radiant heat barrier layers nearer to said inner wall so that the pressure in said storage volume does not exceed a predetermined level during the filling operation.

31. The method of filling a cryogenic fluid storage vessel of the type in which a plurality of radiant heat barrier layers are wrapped about a cold inner wall which defines an inner cryogenic fluid storage container of said vessel and wherein a space between said cold inner wall and a warm outer wall is evacuated, comprising the steps of:

directing a cryogenic fluid to be stored into the inner cryogenic fluid storage container to fill said vessel;

and directing the bulk of the cold boil-off gases generated during the filling of said inner cryogenic fluid storage container between only the successive radiant heat barrier layers that are nearer to said cold inner wall and venting said cold boil-off gases through said warm outer wall.

32. The method of claim 31 including the step of directing the remaining cold boil-off gases between all of the radiant heat barrier layers.

33. The method of claim 32 including the step of controlling the flow of said cold boil-off gases out of said warm outer wall so that pressure in said inner cryogenic fluid storage container does not exceed a predetermined level.

34. The method of claim 31 including the step of controlling the flow of said cold boil-off gases out of said warm outer wall so that pressure in said inner cryogenic fluid storage container does not exceed a predetermined level.

35. The method of claim 31 including the step of directing the cold boil-off gases between the remainder of the successive radiant heat barrier layers in said evacuated space after the filling operation is completed.

36. The method of claim 35 including the step of controlling the flow of said cold boil-off gases out of said warm outer wall so that pressure in said inner cryogenic fluid storage container does not exceed a predetermined level.

References Cited by the Examiner

UNITED STATES PATENTS

| | | | |
|---|---|---|---|
| 1,876,047 | 9/1932 | Edmonds | 62—50 |
| 2,650,478 | 9/1953 | Brown | 62—50 X |
| 2,707,377 | 5/1955 | Morrison | 62—50 |
| 3,133,422 | 5/1964 | Paivanas et al. | 62—50 |
| 3,134,237 | 5/1964 | Canty et al. | 62—50 |
| 3,217,504 | 11/1965 | De Haan | 62—50 X |

LLOYD L. KING, *Primary Examiner.*